(12) United States Patent
Sun et al.

(10) Patent No.: US 9,037,284 B2
(45) Date of Patent: *May 19, 2015

(54) NUMERICAL CONTROL CUTTING MACHINE

(75) Inventors: Baolin Sun, Liaoning (CN); Haifeng Ni, Liaoning (CN); Qingzhang Wang, Liaoning (CN)

(73) Assignee: Dalian Huarui Heavy Industry Group Co., Ltd., Dalian, Liaoning (CH)

( * ) Notice: Subject to any disclaimer, the term of this patent is extended or adjusted under 35 U.S.C. 154(b) by 733 days.

This patent is subject to a terminal disclaimer.

(21) Appl. No.: 13/375,469

(22) PCT Filed: Aug. 26, 2009

(86) PCT No.: PCT/CN2009/073549
§ 371 (c)(1),
(2), (4) Date: Nov. 30, 2011

(87) PCT Pub. No.: WO2010/139140
PCT Pub. Date: Dec. 9, 2010

(65) Prior Publication Data
US 2012/0116571 A1    May 10, 2012

(30) Foreign Application Priority Data

Jun. 1, 2009  (CN) .......................... 2009 1 0011808
Jun. 1, 2009  (CN) ...................... 2009 2 0014302 U

(51) Int. Cl.
B23K 7/00    (2006.01)
B23Q 1/56    (2006.01)
(Continued)

(52) U.S. Cl.
CPC ................ *B23Q 1/012* (2013.01); *B23Q 5/385* (2013.01)

(58) Field of Classification Search
CPC ................ B23Q 1/0054; B23Q 1/012; B23Q 1/25–1/36; B23Q 5/385; G05B 19/404; G05B 2219/37349
USPC .......................................... 700/186, 192, 193
See application file for complete search history.

(56) References Cited

U.S. PATENT DOCUMENTS 3,665,433 A * 5/1972 Gillum et al. ............... 360/266.5
3,942,237 A * 3/1976 Ongaro .......................... 29/417

(Continued)

FOREIGN PATENT DOCUMENTS

DE         2065703 A  *  6/1975  ............. B26D 7/025
WO   WO 2010139141 A1 * 12/2010  ............... B23Q 1/01

*Primary Examiner* — M. N. Von Buhr
(74) *Attorney, Agent, or Firm* — Squire Patton Boggs (US) LLP

(57) ABSTRACT

A cutting machine for cutting metal, comprising: an understructure, rails (8), a driving trolley (2), a driven trolley (3), a cross beam (1), a transverse driving device (4), a hoisting device (6), a tow chain (9), a rail cleaning device (11), a torch support (10) and a software control system. The rails (8) with a circular cross section are parallel mounted on the understructure, and the driving trolley (2) and the driven trolley (3) move synchronously on the rails (8). An automatic longitudinal adjusting device (7) is provided at the driving trolley (2) and at one end of the drawn cross beam (1), and the driven trolley (3) is rigidly connected to the other end of the cross beam (1). Longitudinal driving devices (5) are installed symmetrically at the lower parts of the driving trolley (2) and the driven trolley (3). The longitudinal driving devices (5) comprise rack and pinion and guiding mechanisms for adjusting the distance between the rack and the gear by elastically sliding. The cutting machine according to the invention has a compact structure and operates in a stable and reliable manner.

6 Claims, 3 Drawing Sheets

(51) Int. Cl.
*G06F 19/00* (2011.01)
*B23Q 1/01* (2006.01)
*B23Q 5/38* (2006.01)

(56) References Cited

U.S. PATENT DOCUMENTS

| | | | | |
|---|---|---|---|---|
| 4,052,039 A * | 10/1977 | Koyano et al. | | 266/57 |
| 4,088,049 A * | 5/1978 | Benedict | | 83/240 |
| 4,617,737 A * | 10/1986 | Jung | | 30/273 |
| 5,809,896 A * | 9/1998 | Gersemsky | | 104/93 |
| 6,142,050 A * | 11/2000 | Miki | | 83/425.2 |
| 6,227,582 B1 * | 5/2001 | Ichien | | 293/132 |
| 6,360,671 B1 * | 3/2002 | Nakagami | | 104/168 |
| 7,739,960 B2 * | 6/2010 | Moll et al. | | 105/155 |
| 7,779,737 B2 * | 8/2010 | Newman et al. | | 83/485 |
| 8,720,343 B2 * | 5/2014 | Ni et al. | | 104/96 |

\* cited by examiner

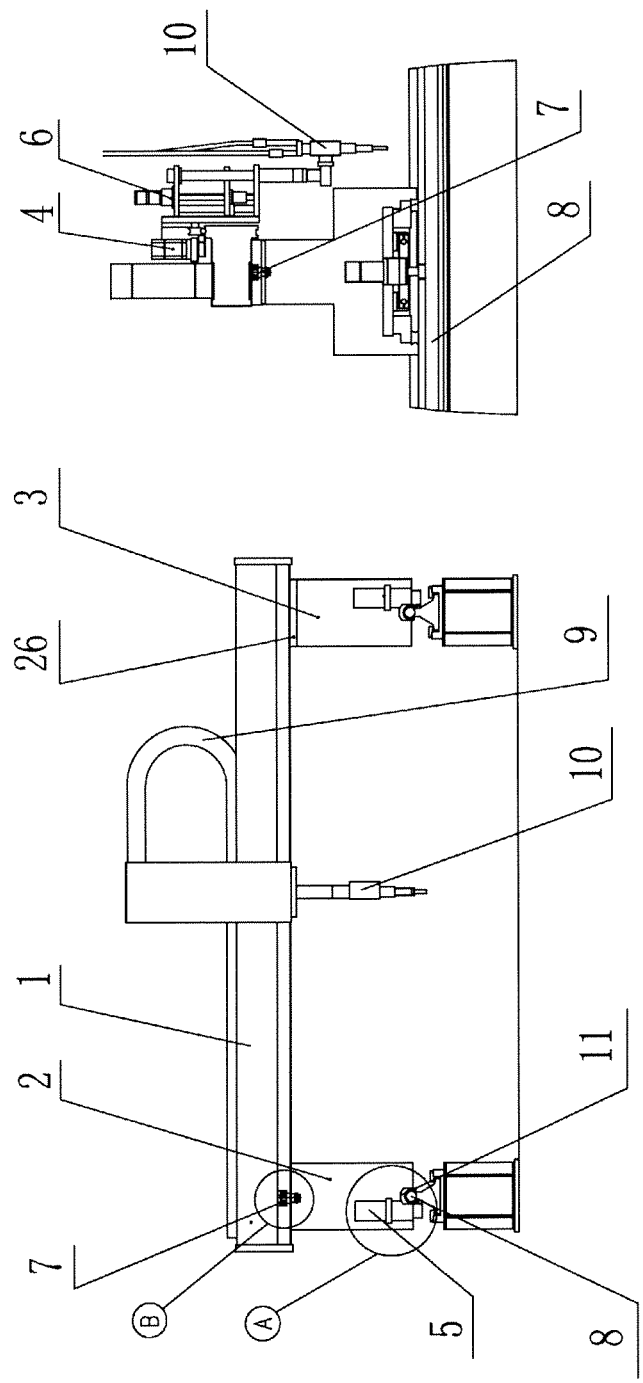

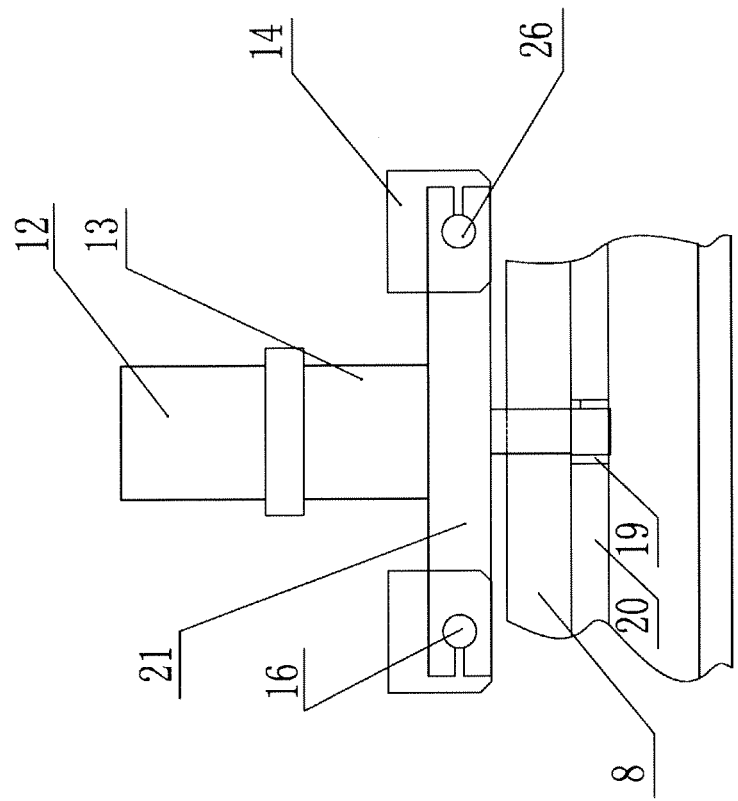
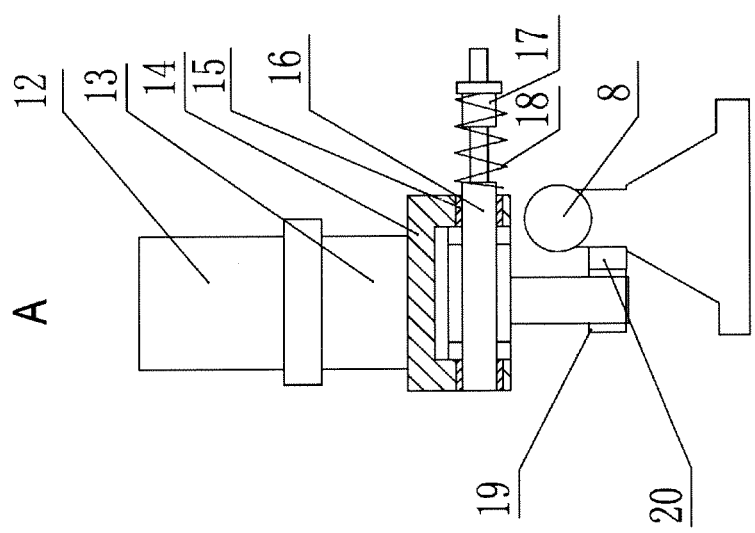
Figure 4
Figure 3

NUMERICAL CONTROL CUTTING MACHINE

TECHNICAL FIELD

The present invention relates to cutting machines for cutting metal and particularly to printer-type cutting machines.

BACKGROUND OF THE INVENTION

At present, there exist a variety of cutting machines for cutting metal members, among which the gantry-type numerical control cutting machine is widely used. This machine comprises an understructure, rails, a driving trolley, a driven trolley, a cross beam, a transverse driving device, a hoisting device, a tow chain, a rail cleaning device, a torch support, and a software control program system. The driving trolley and the driven trolley are symmetrically rigidly connected to two ends of the bottom surface of the welded cross beam. Rails for the driving trolley and the driven trolley to move longitudinally are provided on the understructure. Often the rails have an I-shaped cross-section. A longitudinal driving device is provided on one of the parallel rails, which device comprises a framework, a motor, a transmission, a gear, a longitudinal rack and a single-sided hinge guide mechanism. The longitudinal driving device is of the type in which the tight engagement between the longitudinal driving gear and the longitudinal rack is achieved by an automatic adjustment of the pitch between the gear and the rack by means of a servo driving device and an elastic rotational guiding device. The rotational guiding device employs a hinge structure. Such a machine has following shortcomings and deficiencies:

1. The machine has a complicated structure and is large in size, occupying a lot of space. Its manufacturing is tedious and the cost of manufacture is high.
2. The cross beam is individually welded. The manufacturing is difficult, costly, and it is not easy to ensure manufacturing precision. Meanwhile, the manufactured beam is big, heavy and has an unpleasant appearance.
3. As the two ends of the cross beam are rigidly connected to the driving trolley and the driven trolley, stress and deformation may be incurred due to certain reasons during the operation of the cutting machine. This affects the stable operation of the cutting machine and in serious circumstance machine parts may be damaged.

DETAILED DESCRIPTION OF THE INVENTION

Technical Problems

In order to avoid the disadvantages of the above-mentioned technologies, the present invention provides a cutting machine as the follows: the cutting machine is not only well designed but also has a compact structure; it is not only easy to manufacture but also can operate in a stable and reliable manner. This machine is easy to adjust and delicate, features a pleasant appearance, requires low manufacturing cost, and is convenient to use.

Technical Solution

The objective of the invention is met by the below technical solution:

A cutting machine is provided which comprises an understructure, rails, a driving trolley, a driven trolley, a cross beam, a transverse driving device, a hoisting device, a tow chain, a rail cleaning device, a torch support, and a software control program system, wherein said rails having a circular cross section are parallel mounted on said understructure, said driving trolley and said driven trolley are adapted to move synchronously on said rails, and a transverse-longitudinal perpendicular automatic adjusting device is provided at said driving trolley and an end of said cross beam which is a drawn cross beam, and wherein said driven trolley is rigidly connected to the other end of the cross beam; wherein longitudinal driving devices comprising electrical rack drives and elastic sliding guiding mechanisms are symmetrically mounted at lower parts of said driving trolley and said driven trolley.

Said drawn cross beam is a one-time drawn beam drawn from aluminum alloy.

Said transverse-longitudinal perpendicular automatic adjusting device comprises a rotating shaft, a rolling bearing, a driving bottom plate, and a disc spring, wherein a bottom surface of said cross beam is connected to said driving bottom plate, a hole for housing said rolling bearing is provided at a center of said driving bottom plate, and with said rolling bearing placed in said hole, said rotating shaft is inserted in a shaft hole of said rolling bearing, wherein a bottom end of said rotating shaft is fixed to said driving trolley with said rotating shaft passing through an upper surface of said driving trolley and said disc spring.

Said rigid connection between said driven trolley and said cross beam is in such a way that a bottom surface of said cross beam is connected to a driven connecting plate and said driven connecting plate is connected to said driven trolley.

Each of said electrical rack drives comprises a servo motor, a transmission, a gear, a transmission support, and a rack, wherein said gear adapted to be driven by said transmission driven by said servo motor is mounted on said transmission support; wherein said rack which is engaged with said gear is provided at an outer side of said rails, and wherein said elastic sliding guiding mechanisms are symmetrically provided at two ends of said transmission support.

Each of said elastic sliding guiding mechanisms comprises a guiding support, sliding bearings, a guiding shaft, an adjusting nut, and a spring, wherein an end with a larger diameter said guiding shaft is inserted in a lower section of said guiding support, said sliding bearings are provided at places where each end of said guiding support is engaged with said guiding shaft, to allow an end with a smaller diameter of said guiding shaft to extend beyond the guiding support arranged at an inner side of said rails, and wherein the spring and the adjusting nut are mounted on a section of said guiding shaft extending beyond the guiding support.

Advantages

Compared with existing technologies, the cutting machine according to the present invention provides several advantages such as the follows: it is not only well designed but also has a compact structure; it is not only easy to install and manufacture but also can operate in a stable and reliable manner. Further, the machine is easy to adjust and delicate, features a pleasant appearance, requires low manufacturing cost, and is convenient to use. As the cross beam used in the invention may be a one-time drawn beam drawn from aluminum alloy, not only is the function of the cross beam unaffected but also the cross beam has a light weight, a flat and smooth surface, and a pleasant appearance. At the same time the cross beam is especially suitable for mass production and its production is easy to organize and prepare, thus greatly lowering the manufacturing cost. Furthermore, a transverse-longitudinal perpendicular automatic adjusting device is flexibly connected to the driving trolley and the cross beam; this increases the degree of freedom of the movement of the driving trolley, ensuring the normal and stable operation of the cutting machine. Also, rails having a circular cross section can not only reduce the friction exerted on the driving trolley and the driven trolley during their movement on the rails, but also has a small volume and a light weight. In order to further expand the applicability of the invention, the computer system controlled by a specific software used in existing technologies is redesigned, wherein the operation program of the present invention is designed in such a way that operation of the cutting machine of the present invention is somewhat similar to that of a normal printer connected to a home computer, hence the name "printer-type cutting machine".

DESCRIPTION OF THE DRAWINGS

FIG. 1 is a diagram showing a main view of the structure of a particular embodiment of the present invention;

FIG. 2 is a diagram showing a side view of FIG. 1.

FIG. 3 is a diagram showing an enlarged view of part A of FIG. 1;

FIG. 4 is a diagram showing a side view of FIG. 3; and

Figure 5:
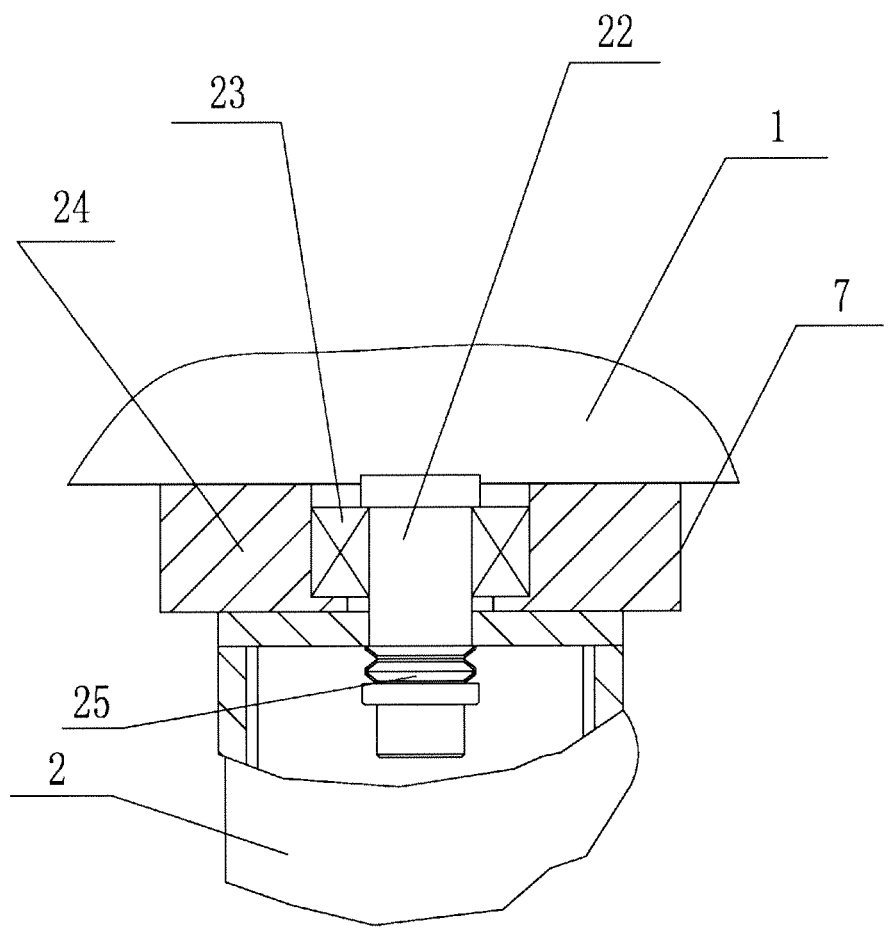
FIG. 5 is a diagram showing an enlarged view of part B of FIG. 4.

In the figures: 1. cross beam, 2. driving trolley, 3. driven trolley, 4. transverse driving device, 5. longitudinal driving device, 6. hoisting device, 7. transverse-longitudinal perpendicular automatic adjusting device, 8. rail, 9. tow chain, 10. torch support, 11. rail cleaning device, 12. servo motor, 13. transmission, 14. guiding support, 15. sliding bearing, 16. guiding shaft, 17. adjusting nut, 18. spring, 19. gear, 20. rack, 21. transmission support, 22. rotating shaft, 23. rolling bearing, 24. driving bottom plate, 25. disc spring, 26. driven connecting plate.

DESCRIPTION OF A PREFERRED EMBODIMENT OF THE INVENTION

FIGS. 1, 2, 3, 4, and 5 present an embodiment of the present invention. It is a printer-type cutting machine for cutting metal installed on rails having a rail length of 12 meters and a distance of 4 meters there-between. The cutting machine comprises an understructure, rails, a driving trolley 2, a driven trolley 3, a cross beam 1, a transverse driving device 4, a hoisting device 6, a tow chain 9, a rail cleaning device 11, a torch support 10, and a software control program system, wherein said rails 8 having a circular cross section are parallel mounted on the understructure and the driving trolley 2 and the driven trolley 3 are adapted to move synchronously on the rails 8. A transverse-longitudinal perpendicular automatic adjusting device 7 is provided at the driving trolley 2 and a left end of the drawn cross beam 1 wherein the transverse-longitudinal perpendicular automatic adjusting device 7 which comprises a rotating shaft 22, a rolling bearing 23, a driving bottom plate 24, and a disc spring 25. The driven trolley 3 is rigidly connected to a right end of the cross beam 1 in such a way that a bottom surface of the cross beam 1 is connected to a driven connecting plate 26 and the driven connecting plate 26 is connected to the driven trolley 3. Longitudinal driving devices 5 comprising electrical rack drives and elastic sliding guiding mechanisms are symmetrically mounted at lower parts of the driving trolley 2 and the driven trolley 3. Each of said electrical rack drives comprises a servo motor 12, a transmission 13, a gear 19, a transmission support 21, and a rack 20; and each of said elastic sliding guiding mechanisms comprises a guiding support 14, sliding bearings 15, a guiding shaft 16, an adjusting nut 17, and a spring 18.

The embodiment described above is only a preferred embodiment of the present invention, but the scope of protection of the present invention is not limited to such embodiment. It will be apparent to those skilled in the art that various modifications and variations can be made without departing from the spirit or scope of the invention. Thus, it is intended that the present invention cover the modifications and variations of this invention provided they come within the scope of the appended claims and their equivalents.

The invention claimed is:

1. A printer-type cutting machine, comprising:
an understructure, rails, a driving trolley, a driven trolley, a cross beam, a transverse driving device, a hoisting device, a tow chain, a rail cleaning device, a torch support, and a software control program system, wherein said rails having a circular cross section are parallel mounted on said understructure, said driving trolley and said driven trolley are adapted to move synchronously longitudinally on said rails, a longitudinal automatic adjusting device is provided at said driving trolley and an end of said cross beam which is a drawn cross beam, and wherein said driven trolley is rigidly connected to the other end of the cross beam, wherein longitudinal driving devices comprising electrical rack drives and elastic sliding guiding mechanisms are symmetrically mounted at lower parts of said driving trolley and said driven trolley.

2. The printer-type cutting machine according to claim 1, wherein said drawn cross beam is a one-time drawn beam drawn from aluminum alloy.

3. The printer-type cutting machine according to claim 1, wherein said longitudinal automatic adjusting device comprises a rotating shaft, a rolling bearing, a driving bottom plate, and a disc spring, wherein a bottom surface of said cross beam is connected to said driving bottom plate, a hole for housing said rolling bearing is provided at a center of said driving bottom plate, and with said rolling bearing placed in said hole, said rotating shaft is inserted in a shaft hole of said rolling bearing, wherein a bottom end of said rotating shaft is fixed to said driving trolley with said rotating shaft passing through an upper surface of said driving trolley and said disc spring.

4. The printer-type cutting machine according to claim 1, wherein said rigid connection is in such a way that a bottom surface of said cross beam is connected to a driven connecting plate and said driven connecting plate is connected to said driven trolley.

5. The printer-type cutting machine according to claim 1, wherein each of said electrical rack drives comprises a servo motor, a transmission, a gear, a transmission support, and a rack, wherein said gear which is adapted to be driven by said transmission driven by said servo motor is mounted on said transmission support, wherein said rack which is engaged with said gear is provided at an outer side of said rails, and wherein said elastic sliding guiding mechanisms are symmetrically provided at two ends of said transmission support.

6. The printer-type cutting machine according to claim 1, wherein each said of said elastic sliding guiding mechanisms comprises a guiding support, sliding bearings, a guiding shaft, an adjusting nut, and a spring, wherein an end with a larger diameter of said guiding is inserted in a lower section of said guiding support, said sliding bearings are provided at places where each end of said guiding support is engaged with said guiding shaft, to allow an end with a smaller diameter of said guiding shaft to extend beyond the guiding support arranged at an inner side of said rails, and wherein the spring and the adjusting nut are mounted on a section of said guiding shaft extending beyond the guiding support.

* * * * *